United States Patent [19]

Watanabe et al.

[11] 4,393,083

[45] Jul. 12, 1983

[54] METHOD FOR PRODUCING GRAPE MUST AND WINE

[75] Inventors: Masazumi Watanabe, Kashiwa; Mikio Uehara, Noda; Yoshimi Shimazu, Noda; Jiro Ishiyama, Noda; Motohiko Kato, Noda, all of Japan

[73] Assignee: Kikkoman Corporation, Noda, Japan

[21] Appl. No.: 276,497

[22] Filed: Jun. 23, 1981

[30] Foreign Application Priority Data

Jul. 7, 1980 [JP] Japan .................................. 55-91749
Jul. 8, 1980 [JP] Japan .................................. 55-92285

[51] Int. Cl.³ ........................... C12G 1/02; C12P 7/20
[52] U.S. Cl. ....................................... 426/15; 435/159
[58] Field of Search ........................... 426/15; 435/159

[56] References Cited

FOREIGN PATENT DOCUMENTS 48-15638  5/1973  Japan.
52-47994  4/1977  Japan.
53-5753   3/1978  Japan.
54-70497  6/1979  Japan.

Primary Examiner—David M. Naff
Attorney, Agent, or Firm—Schuyler, Banner, Birch, McKie & Beckett

[57] ABSTRACT

A glycerol-enriched artificially botrytized grape must is obtained by adding cyclic-3',5'-adenylic acid or cyclic-3',5'-adenylic acid derivatives to a grape must and contacting the must aerobically with the mycelia of *Botrytis cineria* to increase the glycerol content of the must. A noble botrytized wine is obtained by adding a wine yeast to the above artificially botrytized grape must and subjecting the must to fermentation and subsequent aging.

7 Claims, No Drawings

METHOD FOR PRODUCING GRAPE MUST AND WINE

This invention relates to a process for producing an artificially botrytized grape must of an enriched glycerol content and to a process for producing a noble botrytized wine rich in glycerol content and excellent in both bouquest and flavor from said artificially botrytized grape must.

There has, heretofore, been known a process for producing a grape must resulting in a noble bouquet by inoculation of Botrytis cinerea into, for example, a grape must and cultivation of the fungus. In the process, however, the glycerol content of the must, which has an important effect upon the body of the fermented wine, reaches maximum during the cultivation period of *Botrytis cinerea* and thereafter levels off or gradually declines in the later stage, because the surface layer of the fungus cells becomes covered with a large quantity of polysaccharides which prevent the cells from the intake of oxygen and other nutrients in the culture medium, resulting in marked suppression of the growth of the fungus and marked deterioration in glycerol metabolism. For this reason, the final glycerol content of the must is 3% (W/V) at most.

Although various methods have been proposed to improve the glycerol content of the culture obtained by inoculating and cultivating *Botrytis cinerea* in a grape must, all of these methods are complicated to operate and no botrytized grape must containing 6% (W/V) or more of glycerol has ever been obtained.

The present inventors conducted extensive studies to increase the glycerol content of a grape must and, as a result, found a surprising fact that when cyclic-3',5'-adenylic acid or a derivative thereof is added to a grape must and the must is aerobically contacted with the mycelia of *Botrytis cinerea,* the glycerol content of the grape must markedly increases and the formation of polysaccharides extremely decreases as compared with the case of conventional cultivation of said fungus in a grape must containing neither cyclic-3',5'-adenylic acid nor a derivative thereof; moreover, the grape must is improved in flavor and there is substantially no such decline in the formation or accumulation of glycerol as is observed in the conventional process for the cultivation of said fungus in a grape must. It was further found that when the grape must containing cyclic-3',5'-adenylic acid or a derivative thereof is contacted with the mycelia of *Botrytis cinerea* for a period of time longer than the cultivation time of the conventional process, the glycerol content of the must remarkably increases and there is obtained a high-quality noble botrytized must of improved flavor and containing glycerol in an unprecedentedly high concentration of 6 to 11% (W/V) with reduced formation of polysaccharides.

In producing wine from a grape must containing the noble botrytized must added thereto, a fine wine with rich noble bouquet is obtained substantially without accompanying adverse effect of polysaccharides on the filtration efficiency, even though the said noble botrytized must is added in an amount sufficient for increasing the glycerol concentration so as to improve the bouquet and flavor. Particularly when a noble botrytized must containing glycerol in a concentration as high as 6 to 11% (W/V) is added, the amount of the must can be reduced for increasing the glycerol content of the alcoholic fermented must and, hence, the polysaccharide content of the alcoholic fermented must is reduced, leading to prevention of the filtration efficiency from the decline due to the increase in polysaccharide content. Moreover, even when the noble botrytized must is used in a large amount, the flavor is improved by the increase in D-gluconic acid content. Thus, the resulting wine is imparted with well-balanced bouquet and taste, an unprecedentedly high glycerol content, an excellent noble bouquet and an excellent flavor. Based on the above findings, the present invention has been accomplished.

Among the known processes for producing a wine with a noble bouquet, there are a process in which *Botrytis cinerea* is inoculated and cultivated in a grape must to increase the glycerol content of the culture, then the culture is added to a concentrated grape must, and after adding a wine yeast the mixture is allowed to undergo alcoholic fermentation; and a process in which *Botrytis cinerea* is inoculated and cultured in a grape must, then a common wine yeast is added to the resulting glycerol-containing culture and is cultivated aerobically to release efficiently the glycerol contained in the cells of said fungus, and then the alcoholic fermentation is allowed to proceed. In these processes, however, although the cultivation of *Botrytis cinerea* allows the formation of glycerol having an important effect on the body of a wine, it allows, at the same time, the formation of a large quantity of polysaccharides which adversely affect the filtration efficiency of the must after the alcoholic fermentation is completed. Consequently, the amount to be added of the said glycerol-containing culture must be limited by reason of reduced filtration efficiency. This limitation together with an insufficient glycerol content of the culture makes it difficult to increase the glycerol content of the wine to a level sufficiently high for improving the flavor of resulting wine.

Under the circumstances, the present inventors made extensive investigations on the process for producing a noble botrytized wine rich in the body with a high glycerol content, which process enables the grape must to be enriched in glycerol content without decline in the filtration efficiency of the fermented must. It was found, as a result, that a high-quality noble botrytized wine having a rich noble bouquet is obtained without excessive formation of polysaccharides to cause appreciable decline in efficiency for filtration of the fermented must, by aerobically contacting the mycelia of *Botrytis cinerea* with a grape must containing cyclic-3',5'-adenylic acid or a derivative thereof, adding the resulted grape must to a grape must before or during the alcoholic fermentation and allowing the must to undergo fermentation and aging in the usual manner in the presence of said botrytized grape must in an amount sufficient for increasing the glycerol content of the alcoholic fermented must to improve the bouquet and flavor.

An object of this invention is to provide a noble botrytized grape must which is high in glycerol content and excellent in bouquet and flavour.

Other object of this invention is to provide a noble botrytized wine which is high in glycerol content and has well-balanced bouquet and taste, and a process for producing the same.

Further objects and advantages of this invention will be apparent from the following descriptions.

The invention is described below in detail.

The grape must used in the process of this invention is any of the fresh must, concentrated fresh must and mixtures thereof derived from grape varieties such as Kōshu, Riesling, Sémillon or chardonnay. If necessary, sugars such as cane sugar, glucose and fructose may be supplemented, the suitable sugar content being about 15 to about 45% (W/V), preferably 20 to 40% (W/V).

The mycelia of *Botrytis cinerea* is obtained by inoculating the cell or cell culture of *Botrytis cinerea* species such as *Botrytis cinerea* FERM-P No. 1612, *Botrytis cinerea* ATCC 20599 and the like in a *Botrytis cinerea* growing medium such as grape must or a grape must-containing medium and cultivating at a temperature of 10° to 30° C. and a pH of 3 to 6, preferably 4 to 6. The culture containing the mycelia of *Botrytis cinerea* or the mycelia portion may be used.

The term "cyclic-3',5'-adenylic acid" (hereinafter referred to briefly as cAMP), as used herein, includes the free acid and an alkali or alkaline earth metal salt thereof, such as, for example, sodium, potassium or calcium salt. The suitable cAMP derivatives include allyl esters such as $N^6,O^{2'}$-dibutyl ester-cAMP and $N^6$-butyl ester-cAMP. These cAMP compounds and derivatives may be obtained by a synthetic or fermentation method or available commercially.

The contact between the mycelia of *Botrytis cinerea* and the grape must may be effected by adding a *Botrytis cinerea* culture or the mycelia portion thereof to a grape must containing cAMP or a cAMP derivative added thereto, or in any other suitable way. The contact is made at a temperature of 10° to 30° C. and a pH of 3 to 4. The concentration of cAMP or a cAMP derivative is 50 to 1,000 mg/liter, preferably 200 to 800 mg/liter. The aerobic conditions are realizable by the stirred aeration or shaking.

When the time of contact between the grape must and the mycelia of *Botrytis cinerea* is prolonged beyond the cultivation time in the conventional method of *Botrytis cinerea* cultivation (4 to 7 days with submerged culture and 10 to 15 days for the shaking culture), it is possible to obtain a grape must containing glycerol in a concentration as high as 6 to 11% (W/V). The contact time is preferably 9 days or more for the stirred aeration in an ordinary jar fermentor and 20 days or more for the shaking, depending upon the sugar content of the grape must, inoculated amount of the mycelia and aerobic conditions. In the jar fermentor, a suitable rate of aeration is approximately 5 liters per minute per liter. The shaking culture is conducted at an amplitude of 7 cm and a reciprocation rate of 130 per minute or under similar conditions.

The glycerol content of a grape must in contact with the mycelia of *Botrytis cinerea* under the above conditions increases with the time of contact and reaches 6% (W/V) or more, while the formation of polysaccharides remains slightly, the ratio of the glycerol content (g/liter) to the polysaccharides content (g/liter) at the completion of contact being one-third to one-tenth or less of that observed in the conventional *Botrytis cinerea* culture must.

The formation and accumulation of D-gluconic acid observed in the grape must treated according to this invention contribute much to the improvement of flavor.

The grape must contacted with the mycelia of *Botrytis cinerea* is used as such or after having been freed from the mycelia by suitable means such as filtration, centrifugation, and the like (hereinafter both the grape must in contact with the mycelia of *Botrytis cinerea* and the grape must free from the mycelia are referred to as noble botrytized must). The noble botrytized must containing the mycelia is preferred because of more enhanced flavor due to dissolution of mycelia constituents.

The invention is further illustrated below in detail with reference to Experimental Examples and Examples, but the invention is not limited to these examples.

In the following Experimental Example, are shown the relationships among pH, the amount of glycerol formed, and the amount of mycelia.

EXPERIMENTAL EXAMPLE 1

A grape must [sugar content, 15% (W/V)] obtained by pressing from the grape of Kōshu variety was concentrated by mean of an evaporation concentrator (Type CT, Alfa-Laval Co.) to yield a concentrated must. The concentrated must [sugar content, 25% (W/V)] was adjusted to various pH values as shown in Table 1. To the must with adjusted pH, was added potassium salt of cAMP to a concentration of 400 ppm. To one liter of the resulting must placed in a ribbed Erlenmeyer flask of 5-liter capacity, was added 300 ml of moist mycelia of *Botrytis cinerea* ATCC 20599. The must was shaken at 13° to 17° C. for 20 days to obtain an artificially noble botrytized must (amplitude of shaking, 7 cm; rate of reciprocation, 130/minute). The dry mycelia content and the glycerol content of the noble botrytized must thus obtained are as shown in Table 1.

For comparison, the above procedure was repeated, except that a concentrated must [sugar content, 25% (W/V)] containing no potassium salt of cAMP was used. The results are as shown in Table 1. The amount of dry mycelia shown in Table 1 was determined by washing three times the mycelia of 100 ml of the noble botrytized must with distilled water and air drying.

TABLE 1

| | Weight of dry mycelia (g/100 ml) | | Glycerol content (g/liter) | |
|---|---|---|---|---|
| pH | Control | cAMP K—salt added | Control | cAMP K—salt added |
| 3.0 | 0.46 | 0.35 | 17.0 | 69.9 |
| 3.2 | 0.79 | 0.41 | 19.8 | 84.5 |
| 3.4 | 0.85 | 0.42 | 18.0 | 88.7 |
| 3.6 | 0.89 | 0.43 | 15.0 | 75.6 |
| 3.8 | 1.07 | 0.55 | 10.0 | 40.1 |
| 4.0 | 1.40 | 0.69 | 3.6 | 30.8 |
| 4.2 | 1.46 | 0.71 | 3.3 | 25.7 |
| 4.4 | 1.93 | 0.89 | 3.0 | 20.5 |
| 4.6 | 2.24 | 0.91 | 1.8 | 15.8 |

It is seen from Table 1 that at a pH in the range of 3.0 to 3.6, the cAMP-containing noble botrytized must shows only a very little increase in the quantity of mycelia, while a remarkable increase in the glycerol content.

In the following Experimental Example, are shown interrelationships among the cAMP concentration, glycerol and polysaccharides contents.

Experimental Example 2

Into 5-l jar fermentor which had been sterilized with steam, was charged 1.4 liters of a fresh Koshu grape must (sugar content, 15.1%; total acids, 0.62%; pH 3.2) containing potassium salt of cAMP in a concentration as shown in Table 2. To the fermentor, was added 300 ml of moist mycelia obtained by cultivating *Botrytis cinerea* ATCC 20599 in the above grape must (adjusted to pH 4.0). The mycelia and the grape must were allowed to contact aerobically at 13° to 17° C. for 7 days to yield an artificially noble botrytized must. Table 2 shows the glycerol content (g/liter) and the polysaccharides content (g/liter) of the artificial noble botrytized must and the ratio of contents on polysaccharides to glycerol.

For comparison, a fresh Koshu grape must containing no potassium salt of cAMP was treated in the same manner as described above and the results are also shown in Table 2. In Table 2, the amount of polysaccharides was expressed in terms of arabinose. Determination of arabinose was performed in the following method.

The artificial noble botrytized must was filtered with Toyo filter paper No. 5C and 1 ml of the clear filtrate was dialyzed. The dialyzed solution was made up to 100 ml with distilled water and 1 ml of diluted solution was mixed with 1 ml of 25% phenol reagent followed by 5 ml of 36N $H_2SO_4$ to develop a color.

The absorbance was measured at 490 nm and the amount of arabinose was calculated by use of a calbration curve for the standard sample of arabinose.

TABLE 2

| Sample No. | Amount of K—salt of cAMP added (mg/liter) | Glycerol content (g/liter) (A) | Polysaccharides content (g/liter) (B) | B/A × 100 |
|---|---|---|---|---|
| Control | 0 | 22.0 | 1.64 | 7.45 |
| 1 | 50 | 28.5 | 0.69 | 2.42 |
| 2 | 100 | 33.1 | 0.45 | 1.36 |
| 3 | 200 | 48.4 | 0.38 | 0.78 |
| 4 | 400 | 54.5 | 0.35 | 0.64 |
| 5 | 600 | 46.2 | 0.33 | 0.71 |
| 6 | 800 | 38.4 | 0.30 | 0.78 |
| 7 | 1000 | 32.8 | 0.31 | 0.94 |

In the following Experimental Example 3, is shown the relationship between the contact time and the glycerol content when a cAMP-containing grape must was contacted with the *Botrytis cinerea* mycelia.

EXPERIMENTAL EXAMPLE 3

A Koshu grape must obtained by pressing in a customary manner was concentrated by means of an evaporation concentrator (Type CT, Alfa-Laval Co.) to a concentrated must [sugar content, 60% (W/V); pH 3.6]. The sugar content was adjusted as shown in Table 3 to prepare must samples of varied sugar content. Potassium salt of cAMP was added so that each sample may contain 400 ppm of the cAMP salt. To each one liter of the must placed in a ribbed Erlenmeyer flask having a capacity of 5 liters, was added 300 ml of moist mycelia obtained by cultivating *Botrytis cinerea* ATCC 20599 in the above concentrated must which had been adjusted to a sugar content of 25% (W/V) and pH 4.5. The mixture was shaken (amplitude, 7 cm; reciprocation rate, 130/minute) at 13° to 17° C. for 15 to 30 days to obtain an artificial noble botrytized must. Table 3 shows the glycerol content of each noble botrytized must sample after 15 days and 20 days of shaking and contents of glycerol, D-gluconic acid, polysaccharides and mycelia (dry) and the ratio of contents on polysaccharides to glycerol after 30 days of shaking.

For comparison, the above procedure was repeated, except that a fresh must obtained by pressing in a customary manner from the Koshu grape and containing no cAMP salt. The determination of D-gluconic acid was performed by the enzymatic method [McCloskey, L. P., Am. J. Enol. and Vitic., 25 (4), 198 (1974)].

TABLE 3

| | | | | 30 days | | | | |
|---|---|---|---|---|---|---|---|---|
| Sample No. | Sugar content % (W/V) | 15 days Glycerol content (g/liter) | 20 days Glycerol content (g/liter) | Glycerol content (g/liter) (A) | D-gluconic acid content (g/liter) | Polysaccharides content (g/liter) (B) | B/A × 100 | Mycelium content (g/100 ml) |
| Control | 15 | 22.4 | 22.3 | 22.3 | 0.9 | 2.0 | 8.97 | 3.15 |
| 1 | 15 | 41.7 | 60.2 | 72.0 | 3.5 | 0.9 | 1.25 | 2.56 |
| 2 | 20 | 46.9 | 65.3 | 90.5 | 5.3 | 0.7 | 0.77 | 1.66 |
| 3 | 25 | 55.1 | 73.6 | 106.5 | 4.7 | 0.6 | 0.56 | 1.47 |
| 4 | 30 | 56.3 | 76.5 | 108.4 | 4.9 | 0.4 | 0.37 | 0.82 |
| 5 | 35 | 52.8 | 70.8 | 106.0 | 6.5 | 0.4 | 0.38 | 0.58 |
| 6 | 40 | 53.5 | 71.4 | 107.2 | 8.3 | 0.3 | 0.28 | 0.55 |
| 7 | 45 | 31.8 | 60.9 | 64.8 | 7.6 | 0.3 | 0.46 | 0.43 |

EXPERIMENTAL EXAMPLE 4

Various amounts of sodium salt of cAMP, as shown in Table 4, were added to a concentrated must obtained in the same manner as in Experimental Example 3 by concentrating a must derived from Sémillon grape by pressing in the usual way. Into a 3-liter jar fermentor sterilized with steam, was charged each 1.4 liters of the must prepared above. To the must, was added 300 ml of moist mycelia obtained by culture of *Botrytis cinerea* ATCC 20599 in the above grape must adjusted to pH 4.6. The must was aerated at a rate of approximately 5 liters/minute/liter for 6 to 14 days at 13° to 17° C. to yield an artificial noble botrytized must. The glycerol contents on the 6th day and 9th day and the glycerol content and D-gluconic acid content on the 14th day are shown in Table 4.

For comparison, the above procedure was repeated, except that a concentrated must [sugar content, 30% (W/V)] obtained from Sémillon grape without addition of sodium salt of cAMP was used. The results are shown in Table 4.

TABLE 4

| | Amount of Na salt of cAMP added (mg/liter) | 6th day Glycerol content (g/liter) | 9th day Glycerol content (g/liter) | 14th day | |
|---|---|---|---|---|---|
| Sample No. | | | | Glycerol content (g/liter) | D-gluconic acid content (g/liter) |
| Control | 0 | 11.4 | 21.9 | 22.3 | 0.9 |
| 1 | 100 | 40.8 | 61.9 | 82.7 | 4.1 |
| 2 | 200 | 43.7 | 72.6 | 108.3 | 6.2 |
| 3 | 400 | 48.2 | 75.0 | 111.6 | 6.8 |
| 4 | 600 | 49.0 | 75.4 | 112.9 | 6.7 |
| 5 | 800 | 49.4 | 74.9 | 113.8 | 7.2 |
| 6 | 1000 | 42.5 | 66.1 | 99.1 | 6.5 |

As is apparent from the results obtained in Experimental Examples 1 to 5, when a grape must containing cAMP is contacted aerobically with the Botrytis cinerea mycelia, the glycerol content of the must markedly increases. Particularly when the contact was continued for an extended period of time, the glycerol content becomes jampily increased and there is obtained a noble botrytized must having a glycerol content of 6% (W/V) or more. D-gluconic acid which affects the flavor increases also with the contact time. A noble botrytized must having a glycerol content of 10% (W/V) or more is obtainable when the sugar content of the grape must is 25 to 40% and the amount added of cAMP is in the range of 200 to 800 ppm.

Next, a wine which has a noble bouquet and a large glycerol content and is excellent in bouquet and taste can be obtained by adding the noble botrytized grape must enriched in glycerol content obtained as above to a grape must before the beginning of alcohol fermentation or during the fermentation, and then allowing the mixture to fermentation and aging according to the conventional procedures.

That is, in producing a wine by aerobically contacting the Botrytis cinerea mycelia with a grape must to obtain a noble botrytized must, adding the noble botrytized must to a grape must, and subjecting the must to fermentation, the sugar content of the must is adjusted to 20 to 60% (W/V) (if the sugar content of said botrytized must is insufficient, sugar is supplemented or the proportion of the grape must is increased to ensure the prescribed sugar content) and the alcoholic fermentation is allowed to proceed at an initial pH of 3.0 to 3.6 and a temperature of about 10° to about 25° C.

The noble botrytized must can be added to the grape must after the normal fermentation has been started, but preferably before the vigorous stage of fermentation is reached. The amount of the noble botrytized must added to the grape must should be sufficient enough to increase the glycerol content of the fermented must so as to improve the flavor. A desirable of the noble botrytized must to be added to 100 parts by weight of the must is 5 to 60 parts for a noble botrytized must having a glycerol content below 6% (W/V) and 5 to 100 parts by weight if the glycerol content is above 6%. The grape must suitable for the embodiment of this invention includes crushed grape berries, grape juice obtained from grape berries by pressing and clarification, concentrated must obtained from grape juice by concentration, and mixtures thereof, which have been supplemented with sugar if necessary and properly prepared for use in making wine by fermentation.

The alcoholic fermentation can be carried out by use of a common wine yeast at 10° to 25° C. for about 10 days to about 3 months. After completion of the main fermentation, the fermented must is freed from yeast cells and other suspended matters by filtration or other means and the clear liquor is then allowed to mature.

The wine yeast to be used in the alcoholic fermentation may be any of the strains used in ordinary wine making. Examples of such wine yeast strains include N.J.K.-W204, N.J.K.-W302, N.J.K.-304 [these N.J.K. strains are produced and distributed by Nippon Jyōzō Kyōkai (Japan Brewers Association)], Saccharomyces oviformis IAM 4377, Saccharomyces cerevisiae OUT 7080, Saccharomyces cerevisiae IAM 4274, Saccharomyces cerevisiae ATCC 4098, 4108, 4113, Saccharomyces rouxii OUT 7142, Saccharomyces bailii var. osmophilus ATCC 28166, Saccharomyces bailii OUT 7002, Kloeckera apiculata IFO 0865, Kloeckera apiculata IFO 0866, and Kloeckera apiculata IFO 0867. The amount of wine yeast cells to be added or inoculated is similar to that used in ordinary wine making.

After completion of the alcoholic fermentation with wine yeast cells, the fermented must is filtered and cooled, at −4° C. for about one week to precipitate proteins, tartar and others. After removal of the turbidity by filtration, the fermented must is stored at a temperature below 15° C. to obtain a glycerol-rich wine having excellent noble bouquet and flavor.

In the following Experimental Example 5, are shown the experimental results of wine making by using the artificial noble botrytized must obtained in Experimental Example 2.

EXPERIMENTAL EXAMPLE 5

Each one liter of the control sample and samples No. 1 to No. 7 of artificial noble botrytized must obtained in Experimental Example 2 was mixed with 9 liters of a freeze-concentrated must having a sugar content of 25%. After addition of cultured cells of Saccharomyces oviformis IAM 4377 to a concentration of $10^7$ cells per ml of the mixed must, fermentation was carried out at 17° C. for 35 days. After completion of the fermentation, the fermented must was filtered and treated by following the industrial process to obtain a noble botrytized wine. The new wine was filtered by means of Zenith Z filter of Seitz Co. (filter paper: AS 10×10 $cm^2$) and 10 liters of fermented must was filtered under a nitrogen pressure of 2 atmospheres. Table 5 shows the rate of filtration (volume of liquor passed through the filter in 30 minutes) and the results of the organoleptic test on the wine was obtained by a panel of 10 experienced wine tasters and based on the method of 20 points: color tone, 0 to 4; bouquet, 0 to 4; flavor, 0 to 12 (the same applies hereinafter).

TABLE 5

| Sample No. | Rate of filtration (liter/30 min.) | Organoleptic evaluation | | | |
|---|---|---|---|---|---|
| | | Color tone | Bouquet | Flavor | Total |
| Control | 1.6 | 3 | 1.5 | 7.5 | 12.0 |
| 1 | 5.2 | 3 | 1.9 | 9.9 | 14.8 |
| 2 | 6.1 | 3 | 3.0 | 11.5 | 17.5 |
| 3 | 7.8 | 3 | 3.5 | 11.5 | 18.0 |
| 4 | 7.4 | 3 | 3.8 | 11.6 | 18.4 |
| 5 | 7.2 | 3 | 2.8 | 11.2 | 17.0 |
| 6 | 7.4 | 3 | 2.0 | 10.1 | 15.1 |
| 7 | 7.2 | 3 | 1.8 | 9.4 | 14.2 |

As is apparent from the results shown in Table 5, it was found that a fine wine excellent in both bouquet and flavor, as estimated by the organoleptic evaluation, was obtained when the amount of addition of potassium salt of cAMP was in the range of from 100 to 600 ppm (samples No. 1 to No. 5).

In the following Experimental Example, are shown the results of organoleptic evaluation performed on the control sample and samples of botrytized wines obtained by using noble botrytized must obtained in Experimental Example 3 by contacting each grape must with the mycelia for 30 days.

EXPERIMENTAL EXAMPLE 6

Each 0.5 liter of the samples of artificial noble botrytized must, obtained in Experimental Example 3 (samples No. 1 to No. 7) by contacting the grape must with the mycelia for 30 days, was mixed with 9.5 liters of the freeze-concentrated grape must having a sugar content of 25%. Cell culture of *Saccharomyces serevisiae* IAM 4274 were added to the mixed must to a concentration of $10^7$ cells per ml of the must and the fermentation was allowed to take place at about 17° C. for 35 days. After fermentation, the new wine was filtered and treated by following the usual process to obtain a noble botrytized wine. The results of filtration test performed as in Experimental Example 5 and the results of organoleptic valuation of each wine are shown in Table 6.

For comparison, a noble botrytized wine (control 1 in Table 6) was made from the artificial noble botrytized must (control sample in Experimental Example 3) obtained by contacting the grape must with the mycelia for 30 days in the absence of potassium salt of cAMP. Another noble botrytized wine (control 2 in Table 6) was produced by mixing one liter of the artificial noble botrytized must Sample No. 1 of Experimental Example 3, obtained by contacting the grape must with the mycelia for 15 days, with 9 liters of the freeze-concentrated grape must having a sugar content of 25% and treating the mixed must in the same way as described above. The test results for the controls 1 and 2 are also shown in Table 6.

TABLE 6

| Sample No. | Rate of filtration (liter/30 min.) | Organoleptic evaluation | | | |
|---|---|---|---|---|---|
| | | Color tone | Bouquet | Flavor | Total |
| Control 1 | 2.0 | 2.0 | 2.5 | 8.0 | 12.5 |
| Control 2 | 6.3 | 2.5 | 2.5 | 11.0 | 16.0 |
| 1 | 7.6 | 2.5 | 2.8 | 12.1 | 17.4 |
| 2 | 7.2 | 2.5 | 2.9 | 12.5 | 17.9 |
| 3 | 7.3 | 2.6 | 2.9 | 13.1 | 18.6 |
| 4 | 8.6 | 2.5 | 2.8 | 13.0 | 18.3 |
| 5 | 8.4 | 2.4 | 2.7 | 13.1 | 18.2 |
| 6 | 8.5 | 2.3 | 2.7 | 13.0 | 18.0 |
| 7 | 8.8 | 2.3 | 2.6 | 12.1 | 17.0 |

It is evident from the results shown in Table 6 that the noble botrytized wines (samples No. 1 to No. 7) made from the noble botrytized must having a glycerol content of 6% (W/V) or above show good filtration efficiencies as shown above and are of superior quality, being particularly excellent in bouquet and taste.

As described in the foregoing, according to this invention, when the mycelia of *Botrytis cinerea* is aerobically contacted with a grape must containing cAMP or a derivative thereof, the glycerol content of the must is markedly increased and reaches as high as 6% (W/V) or more if the contact time is extended, and the D-gluconic acid content, which affects the bouquet and taste, is also increased. In making wine by use of such a noble botrytized must, even if the amount of addition of the latter to the grape must is increased to be sufficient enough to increase the glycerol content so that the bouquet and taste of the resulting wine may be improved, the effect of polysaccharides upon the filtration efficiency of the fermented must is substantially not observed, a high rate of filtration being an important advantage in the commercial wine making. Especially when a noble botrytized must having a glycerol content as high as 6 to 11% (W/V) is used, the amount of addition can be reduced for the given increase in glycerol content of the fermented must, resulting in an increase in filtration efficiency owing to the decrease in polysaccharide content. It is also possible to increase the amount of addition of the noble botrytized must having a high level of glycerol content, because the bouquet and taste of the wine is improved owing to the increased D-gluconic acid content of the noble botrytized must. Thus, the wine obtained according to this invention has well-balanced bouquet and taste, and an unprecedentedly high glycerol content, and is excellent in both noble bouquet and flavor.

The invention is illustrated below with reference to Examples.

EXAMPLE 1

A cAMP or derivatives of cAMP shown in Table 7 were added to a fresh Sémillon grape must [total sugar content, 15.1% (W/V); total acid, 6 g/liter; pH 3.2]. Each 1.5 liters of the resulting grape must was charged into a 3-liter jar fermentor and to the jar fermentor, was added 300 ml of moist mycelia obtained by the shaking culture of *Botrytis cinerea* ATCC 20599 in the above-noted grape must (adjusted to pH 4.0) at 15° C. for 7 days. The must and the mycelia were kept in contact with each other at 14° to 18° C. for 7 days. The glycerol content of each noble botrytized must thus obtained is as shown in Table 7.

For comparison, a control sample of noble botrytized must was obtained by repeating the above procedure, except that cAMP or derivatives thereof were not used. The glycerol content of the control sample is as shown in Table 7.

EXAMPLE 2

Each one liter of the noble botrytized must obtained in Example 1 was placed in a 11-liter glass bottle. To the must, was added 9 liters of a concentrated must [sugar content, 32.5% (W/V); pH 3.1] prepared by the freeze-concentration of a Kōshu grape must by means of a freezer (Type IEWH 23-1-1 of Wirpool Co.). After addition of 450 ml of a pure culture of *Saccharomyces cerevisiae* IAM 4274, the bottle was closed with a fermentation plug and kept in stationary state at 18° C. for 45 days to allow the fermentation to take place. After completion of the fermentation, the fermented must was stored in a cask at 13° C. for 6 months. The fermented must was then filtered in the same manner as in Experimental Example 5 by using Zenith Z filter of Seitz Co. [filter paper: AS 10×10 cm]. The rate of filtration (volume of filtrate obtained in 30 minutes) was as shown in Table 7. A superior-quality noble botrytized wine having a rich noble bouquet was obtained by the simulated commercial process including bottling and storing at 15° C. for 6 months. The rating (in terms of total point) of each wine, as determined by the organoleptic evaluation is as shown in Table 7.

For comparison, a control sample was obtained in the same manner as described above, except that neither cAMP nor a cAMP derivative was used. The results of the test are as shown in Table 7.

TABLE 7

| Sample No. | Type and amount of cAMP | Glycerol content (g/liter) | Rate of filtration (liter per 30 min.) | Organoleptic evaluation (total point) |
|---|---|---|---|---|
| Control | 0 | 2.1 | 1.6 | 13.0 |
| 1 | cAMP 400 ppm | 50.6 | 8.9 | 18.3 |
| 2 | cAMP Ca-salt 400 ppm | 56.8 | 7.0 | 18.7 |
| 3 | 6-Benzyl-cAMP 400 ppm | 40.3 | 6.3 | 18.0 |

TABLE 7-continued

| Sample No. | Type and amount of cAMP | Glycerol content (g/liter) | Rate of filtration (liter per 30 min.) | Organoleptic evaluation (total point) |
|---|---|---|---|---|
| 4 | $N^6$—butyl-ester-cAMP 400 ppm | 42.8 | 6.1 | 18.1 |

EXAMPLE 3

To 10 liters of a concentrated must [sugar content, 32.4% (W/V); pH 3.4] obtained by concentrating a fresh Kōshu grape must [sugar content, 16.5% (W/V); total acid, 0.62] by means of a concentrator [type CT of Alfa-Laval Co.], was added cAMP or a cAMP derivative to a concentration as shown in Table 8. The must was charged into a 20-liter jar fermentor sterilized with steam. To the juice, was added 500 ml of a moist mycelia preculture of *Botrytis cinerea* ATCC 20599. The aerobic contact was continued for 11 days at a temperature of 13° to 17° C. and a rate of aeration of 5 liters/minute/liter. The glycerol content of each noble botrytized must is as shown in Table 8.

Each 2 liters of the noble botrytized must was placed in a 11-liter glass bottle. To the must, was added 8 liters of a concentrated must [sugar content, 32.5% (W/V); pH 3.3] prepared by the freeze-concentration of a Kōshu grape must by means of a freezer (type IEWH 23-1-1 of Wirpool Co.). After addition of 500 ml of the pure culture of *Saccharomyces cerevisiae* IAM 4274, the bottle was closed with a fermentation plug and kept in a stationary state at 18° C. for 30 days to allow the fermentation to proceed. After completion of the fermentation, the lees were withdrawn and the must was further filtered through Zenith Z filter of Seitz Co. (filter paper, AS 10×10 cm²) in the same manner as in Experimental Example 5. The rate of filtration, in terms of liter per 30 minutes, is as shown in Table 8. The new wine was bottled and stored at 15° C. Three months after the bottling, there was obtained a superior quality noble botrytized wine having a rich noble bouquet. The results of organoleptic evaluation, in terms of total point, are as shown in Table 8.

For comparison, a control sample was prepared by repeating the above procedure, except that cAMP or a cAMP derivative was not used.

TABLE 8

| Type and concentration of cAMP | Glycerol content (g/liter) | Rate of filtration (liter/30 min.) | Organoleptic evaluation (total point) |
|---|---|---|---|
| Control | 22 | 0.6 | 14.0 |
| cAMP, 600 mg/liter | 83 | 8.1 | 19.2 |
| cAMP Ca-salt, 300 mg/liter | 86 | 8.8 | 19.6 |
| $N^6$—butyl ester-cAMP, 400 mg/liter | 64 | 7.2 | 18.0 |

EXAMPLE 4

To 5 liters of a concentrated must [sugar content, 40.5% (W/V); pH 3.1] obtained by freeze-concentrating a fresh Chardonnay grape must [sugar content, 16% (W/V); pH 3.2] by means of a freezer in the same manner as in Example 3, was added one liter of a Chardonnay grape must obtained by passing through a crusher-stemmer. Into the resulting mixed grape must, was inoculated a wine yeast strain N.J.K.-W204 (maintained and distributed by Nippon Jyōzō Kyokai) to a concentration of $10^9$ cells per ml of the grape must. The fermentation was allowed to proceed at 18° C. for 10 days and then the grape skins were removed. To the fermented must, was added a noble botrytized must (glycerol content, 71 g/liter) obtained by adding 1.6 g of potassium salt of cAMP to 4 liters of the same Chardonnay grape must [sugar content, 16% (W/V); pH 3.2] as used above, charging the potassium salt of cAMP-containing must) into a 6-liter jar fermentor, adding to the fermentor 500 ml of moist mycelia of *Botrytis cinerea* ATCC 20599 obtained by the customary shaking culture, and stirring at 18° C. for 10 days while aerating at a rate of 6 liters/minute/liter. The resulting mixture was allowed to undergo further fermentation at 18° C. for 30 days. After completion of the fermentation, the new wine was filtered in the same manner as in Example 3, then bottled and aged at 15° C. for 6 months. Thus, there was obtained by the simulated commercial process a noble botrytized wine having a rich noble bouquet and flavor.

Analysis of the wine gave a glycerol content of 47.5 g/liter and a D-gluconic acid content of 2.7 g/liter. The rate of filtration was 8.5 liters per 30 minutes.

EXAMPLE 5

A noble botrytized must (glycerol content, 75 g/liter) was obtained by adding 1.2 g of potassium salt of cAMP to 3 liters of a concentrated must [sugar content, 30.5% (W/V); pH 3.1] obtained by freeze-concentrating a fresh Riesling grape must [sugar content, 18% (W/V); pH 3.2] by means of a freezer in the same manner as in Example 3, charging the potassium salt of cAMP-containing concentrated must into a 5-liter jar fermentor, adding to the fermentor 500 ml of moist mycelia of *Botrytis cinerea* ATCC 20599 obtained by the customary shaking culture, and stirring the mixture at 18° C. for 10 days while aerating at a rate of 10 liters/minute/liter. The resulting noble botrytized must was filtered to obtain a mycelia-free must. This mycelia-free must was mixed with 7 liters of the same concentrated Riesling grape must as used above. Into the mixed must, was inoculated a pure culture of wine yeast strain N.J.K.-W304 (produced and distributed by Nippon Jyōzō Kyōkai) at a rate of $10^7$ cells per ml of the mixed must. The fermentation was allowed to take place at 18° C. for 30 days. After completion of the fermentation, the new wine was filtered through Zenith Z filter of Seitz Co. (filter paper: AS 10×10 cm²) in the same manner as in Example 3, then bottled and stored at 12° C. for 6 months. Thus, there was obtained a botrytized wine having a rich noble bouquet and flavor by the simulated commercial process.

The analysis of the wine gave a glycerol content of 40 g/liter and a D-gluconic acid content of 2.4 g/liter. The rate of filtration was 9.0 liters per 30 minutes.

What is claimed is:

1. A noble botrytized grape must enriched in glycerol content to about 6% (w/v) or more obtained by adding a compound selected from the group consisting of cyclic-3',5'-adenylic acid; an alkali metal salt of cyclic-3',5'-adenylic acid; an alkaline earth metal salt of cyclic-3',5'-adenylic acid; $N^6,O^2$-dibutyl-cyclic-3',5'-adenylic acid and $N^6$-butylestercyclic-3',5'-adenylic acid to a grape must and fermenting the grape must aerobically with mycelia of Botrytis cinerea.

2. A noble botrytized grape must according to claim 1, wherein the sugar content of the grape must is 15 to 45% (W/V).

3. A noble botrytized grape must according to claim 1, wherein the *Botrytis cinerea* is Botrytis cinerea ATCC 20599.

4. In a process for producing a noble botrytized wine comprising adding a wine yeast to a grape must and subjecting the must to alcoholic fermentation and subsequent ageing the improvement which comprises adding to said grape must, before or after commencement of said alcoholic fermentation, a noble botrytized grape must enriched in glycerol content to about 6% (w/v) or more obtained by aerobically fermenting mycelia of *Botrytis cinerea* in a grape must containing an added compound selected from the group consisting of cyclic-3′,5′-adenylic acid; an alkali metal salt of cyclic-3′,5′-adenylic acid; an alkaline earth metal salt of cyclic-3′,5′-adenylic acid; $N^6,O^2$-dibutyl-cyclic-3′,5′-adenylic acid and $N^6$-butylester-cyclic-3′,5′-adenylic acid.

5. A process according to claim 4, wherein the alkali metal salt of cyclic-3′,5′-adenylic acid is the sodium salt of cyclic-3′,5′-adenylic acid.

6. A process according to claim 4, wherein the amount added of the compound is 100 to 1,000 ppm.

7. A process according to claim 4, wherein the *Botrytis cinerea* is Botrytis cinerea ATCC 20599.

* * * * *